United States Patent
Cunningham et al.

(10) Patent No.: US 10,333,160 B2
(45) Date of Patent: Jun. 25, 2019

(54) INTEGRATED FUEL CELL BLOCK WITH A REVISED FUEL CELL CYCLE FOR IN BLOCK REFORMING FUEL CELLS

(71) Applicant: LG Fuel Cell Systems Inc., North Canton, OH (US)

(72) Inventors: Robert Cunningham, Derby (GB); Eric Dean, Derby (GB); Gerry Agnew, Uttoxeter (GB); Michele Bozzolo, Derby (GB)

(73) Assignee: LG FUELL CELL SYSTEMS INC., North Canton, OH (US)

( * ) Notice: Subject to any disclaimer, the term of this patent is extended or adjusted under 35 U.S.C. 154(b) by 0 days.

(21) Appl. No.: 15/801,112

(22) Filed: Nov. 1, 2017

(65) Prior Publication Data

US 2018/0123151 A1    May 3, 2018

Related U.S. Application Data

(63) Continuation-in-part of application No. 15/341,376, filed on Nov. 2, 2016.

(60) Provisional application No. 62/416,371, filed on Nov. 2, 2016.

(51) Int. Cl.
| | |
|---|---|
| H01M 8/22 | (2006.01) |
| H01M 8/124 | (2016.01) |
| H01M 8/0612 | (2016.01) |
| H01M 8/0662 | (2016.01) |
| H01M 8/2465 | (2016.01) |
| H01M 8/04007 | (2016.01) |
| H01M 8/04014 | (2016.01) |
| H01M 8/04082 | (2016.01) |
| H01M 8/04089 | (2016.01) |

(Continued)

(52) U.S. Cl.
CPC ... *H01M 8/04283* (2013.01); *H01M 8/04007* (2013.01); *H01M 8/04022* (2013.01); *H01M 8/04097* (2013.01); *H01M 8/04111* (2013.01); *H01M 8/04201* (2013.01); *H01M 8/0618* (2013.01); *H01M 8/0662* (2013.01); *H01M 8/22* (2013.01); *H01M 8/2465* (2013.01); *H01M 2008/1293* (2013.01); *H01M 2250/20* (2013.01); *Y02E 60/525* (2013.01); *Y02T 90/32* (2013.01)

(58) Field of Classification Search
None
See application file for complete search history.

(56) References Cited

U.S. PATENT DOCUMENTS

| | | |
|---|---|---|
| 6,391,484 B1 | 5/2002 | Keskula et al. |
| 8,062,802 B2 | 11/2011 | Devriendt et al. |
| 2008/0090113 A1 | 4/2008 | Keefer et al. |

(Continued)

*Primary Examiner* — Maria Laios
(74) *Attorney, Agent, or Firm* — Dentons US LLP

(57) ABSTRACT

A fuel cell system having a cathode, anode and auxiliary loop is provided. The anode loop may be configured to deliver reformed and unreformed fuel to the fuel cells. Unreformed fuel may be provided to the fuel cells by bypassing a portion of the fuel around a reformer. The unreformed fuel may be reformed in the fuel cell block. The cathode loop may direct a portion of oxidant exhausted from said fuel cells back to the fuel cell through a cathode ejector. The ejector may be supplied with pressurized oxidant that may be heated prior to entering the cathode ejector. The auxiliary loop may combust unused fuel and oxidant to provide the heat transferred to the oxidant prior to the oxidant entering the cathode loop.

1 Claim, 14 Drawing Sheets

(51) Int. Cl.
*H01M 8/04111* (2016.01)
*H01M 8/04276* (2016.01)

(56) References Cited

U.S. PATENT DOCUMENTS

| | | |
|---|---|---|
| 2009/0042068 A1 | 2/2009 | Weingaertner et al. |
| 2014/0216036 A1 | 8/2014 | Bozzolo et al. |
| 2015/0030947 A1* | 1/2015 | Saunders .......... H01M 8/04022 429/415 |
| 2015/0096506 A1 | 4/2015 | Kelly et al. |

* cited by examiner

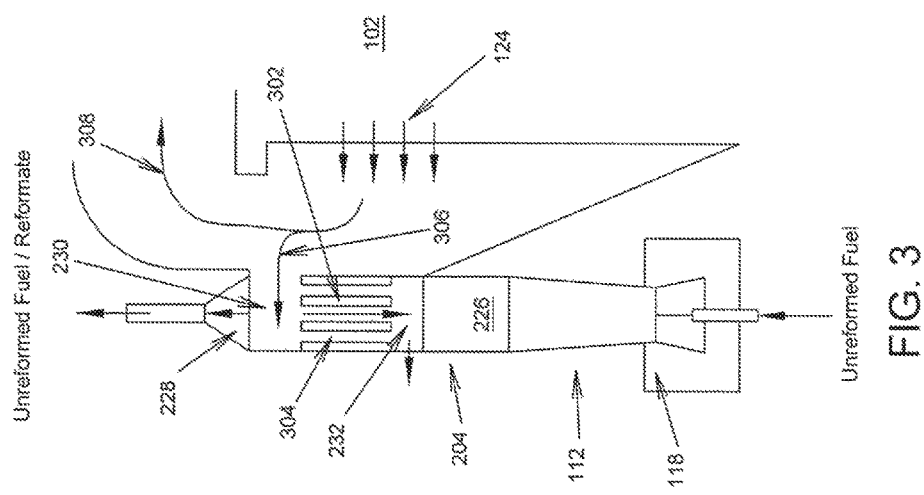

INTEGRATED FUEL CELL BLOCK WITH A REVISED FUEL CELL CYCLE FOR IN BLOCK REFORMING FUEL CELLS

CROSS-REFERENCE TO RELATED APPLICATIONS

This application claims priority to and is a continuation-in-part of U.S. patent application Ser. No. 15/341,376, titled "Revised Fuel Cell Cycle for In Block Reforming Fuel Cells," filed Nov. 2, 2016, the entirety of which is incorporated herein by reference. This application also claims priority to U.S. Prov. Pat. App. No. 62/416,371, titled "Integrated Fuel Cell Block with a Revised Fuel Cell Cycle for In Block Reforming Fuel Cells," filed Nov. 2, 2016, the entirety of which is incorporated herein by reference.

FIELD

This disclosure generally relates to fuel cell systems. More specifically, this disclosure is related to fuel cell systems and methods that provide for revised fuel cell system cycles that are optimized for in-block reforming fuel cells.

BACKGROUND

A fuel cell is an electrochemical system in which a fuel (such as hydrogen) is reacted with an oxidant (such as oxygen) at high temperature to generate electricity. A fuel cell is typically supported by a system of components such as reformers, heat exchangers, ejectors, combustors, fuel and oxidant sources, and other components. For example, a source of unreformed fuel may be supplied via a fuel ejector to the fuel cell system reformer. The reformer may partially or completely reform the fuel by steam, dry, or other reforming method to produce a reformate that is supplied to the anodes of the fuel cell. The fuel cell may exhaust unused fuel from the anode and supply the unused fuel to either the suction of the fuel ejector or an auxiliary system.

To facilitate the reformation of the unreformed fuel, the fuel cell system may provide a heat input to the reformer by supplying the cathode exhaust, or other hot fluid, to the reformer. After transferring its heat into the reforming fuel, the cathode exhaust may be supplied to an auxiliary system, recycled back to the cathode inlet via an oxidant air ejector, or both.

While the temperature of the recycled and fresh oxidant supplied to the cathode will increase as it passes through the fuel cell stack, the heat input into the cathode flow may be insufficient to maintain the cathode loop in thermal equilibrium given the large heat input needed to support the reformation of the hydrocarbon fuel. To thermally balance the cathode loop, a heat exchanger may be introduced in the cathode loop, typically upstream of the cathode inlet. This heat exchanger may be supplied with the combustion products from the reaction of unused fuel and the cathode exhaust supplied to an auxiliary system. This reaction may occur in the heat exchanger or in a component, such as, e.g., a combustor, upstream of the heat exchanger.

The cathode loop is maintained in thermal equilibrium during normal operations. The heat generated within the fuel cell stack, the heat transferred into the fuel in the reformer, the cooling effect of the oxidant mixing at the cathode ejector, and the heat input from the heat exchanger will balance to maintain this thermal equilibrium; in fact, the heat exchanger upstream of the cathode inlet is sized for just such a purpose.

One type of fuel cell is the solid oxide fuel cell (SOFC). The basic components of a SOFC may include an anode, a cathode, a solid electrolyte, and an interconnect. The fuel may be supplied to the anode, and the oxidant may be supplied to the cathode of the fuel cell. At the cathode, electrons may ionize the oxidant. The electrolyte may comprise a material that allows the ionized oxidant to pass therethrough to the anode while simultaneously being impervious to the fluid fuel and oxidant. At the anode, the fuel is combined with the ionized oxidant in a reaction that releases electrons which are conducted back to the cathode through the interconnect. Heat generated from ohmic losses is removed from the fuel cell by either the anode or cathode exhaust flows or is radiated to the environment. The heat from these electrical loses could be used for the reformation of a hydrocarbon fuel within the fuel cell stack.

A SOFC may be structured, e.g., as a segment-in-series or in-plane series arrangement of individual cells. The oxidant is typically introduced at one end of the series of cells and flows over the remaining cells until reaching the cathode exhaust outlet. Each fuel cell transfers heat into the oxidant thereby raising its temperature and forming a temperature gradient that increases from the oxidant inlet to the exhaust. A temperature gradient may also develop in the fuel cell which increases from the oxidant inlet to the oxidant exhaust. These temperature gradients cause thermal stresses that may cause material degradation or failure of the fuel cell components or may reduce fuel cell performance.

The anode of a SOFC may be a mixed cermet comprising nickel and zirconia (such as, e.g., yttria stabilized zirconia (YSZ)) or nickel and ceria (such as, e.g., gadolinia dope ceria (GDC)). Nickel, and other materials, may function not only to support the chemical reaction between the fuel and the ionized oxidant but may have catalytic properties which allow the anode to reform a hydrocarbon fuel within the fuel cell. One method of reforming the hydrocarbon fuel is steam reforming of methane ($CH_4$), an endothermic reaction (Equation 1):

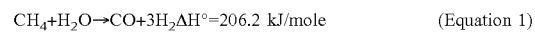

$$CH_4 + H_2O \rightarrow CO + 3H_2 \quad \Delta H° = 206.2 \text{ kJ/mole} \quad \text{(Equation 1)}$$

Alternative methods of reforming are also available. For example, the hydrocarbon fuel may be reformed by carbon dioxide reforming (also known as dry reforming) (Equation 2):

$$CO_2 + CH_4 \rightarrow 2H_2 + 2CO \quad \text{(Equation 2)}$$

The heat necessary for the reformation of methane could be supplied directly from the heat generated within the stack. This direct heat transfer may help cool the stack, reduce thermal stresses and improve overall stack performance.

Additionally, the direct heat transfer may remove or reduce the amount of heat needed for the reformation of a hydrocarbon fuel in the reformer. The removal of this large heat sink in the cathode loop may allow for a revised fuel cell cycle that improves fuel cell system efficiency while maintaining the cathode loop in thermal equilibrium.

There remains a need for revised fuel cell thermodynamic cycles for fuel cells that are configured for internal block reforming.

In accordance with some embodiments of the present disclosure, a fuel cell cycle is presented. The cycle may maintain the overall thermal balance of the cathode loop. The cycle may not require a heat transfer from the cathode exhaust into the reformer to facilitate a catalytic reformation of unreformed fuel. The fuel, either all or a portion thereof, may be reformed internally by either wet or dry reforming, wherein the heat necessary for the reformation of the unreformed hydrocarbon fuel is transferred from the heat generated with the fuel cell stack. An external reformer may be reduced in size when compared to reformers used in fuel cell cycles in which all or a majority of the fuel is reformed external to the fuel cell block. The heat exchanger upstream of the cathode inlet may be removed. In some embodiments, the fuel cell cycle may not contain an auxiliary loop.

In accordance with some embodiments of the present disclosure, a fuel cell system is provided. The fuel cell system may comprise a source of unreformed fuel and a source of oxidant. The system may further comprise a fuel cell stack, an anode ejector, a reformed, an auxiliary ejector, and a cathode ejector. The fuel cell stack may comprise a plurality of fuel cells each having an anode, cathode and an electrolyte. The fuel cell may be an SOFC. The stack may further comprise a fuel supply manifold configured to receive a reformate and unreformed fuel and to supply the reformate and unreformed fuel to the fuel cell, a fuel exhaust manifold configured to exhaust unused fuel from the fuel cell stack, an oxidant supply manifold configured to receive an oxidant and to supply the oxidant to the fuel cell and an oxidant exhaust manifold configured to exhaust the oxidant from the fuel cell stack. The anode ejector may be configured to receive unreformed fuel from the source of fuel and to receive a portion of the unused fuel exhausted from the fuel cell stack. The reformer may comprise a plurality of cold-side channels and a plurality of hot-side channels, a fuel supply manifold configured to receive fuel from the anode ejector and to supply the fuel to the plurality of cold-side channels, a fuel exhaust manifold configured to exhaust reformate from the plurality of cold-side channels and to supply the reformate to the fuel supply manifold of the fuel cell stack, an oxidant inlet manifold configured to receive a portion of the oxidant exhausted from the fuel cell stack and to supply the oxidant to the plurality of hot-side channels, and an oxidant exhaust manifold configured to exhaust the oxidant from the plurality of hot-side channels. The auxiliary ejector may be configured to receive a portion of the unused fuel exhausted from the fuel cell stack and to receive the oxidant exhausted from the plurality of hot channels of the reformer. The auxiliary ejector may further receive oxidant from the oxidant source, and a portion of a recycled auxiliary flow. The cathode ejector may be configured to receive oxidant from a compressor and to receive oxidant exhausted from the oxidant exhaust manifold of the fuel cell stack and to supply oxidant to the oxidant inlet manifold of the fuel cell stack. The fuel cell system may further comprise a combustor configured to receive unused fuel and oxidant exhausted from the auxiliary ejector, a turbine configured to receive the exhaust from the combustor, and a compressor configured to receive oxidant from the oxidant source. The system may further comprise a heat exchanger having hot- and cold-side channels. The heat exchanger may receive oxidant from the oxidant source in the cold-side channels and exhaust from the combustor in the hot-side channels. The heat exchanger may be located upstream of the cathode ejector.

In accordance with some embodiments of the present disclosure, a fuel cell system is provided. The fuel cell system may be a SOFC system. The system may comprise a fuel cell stack, a reformer, an anode loop, a cathode loop, and an auxiliary loop. The (solid oxide) fuel cell stack may comprise at least one (solid oxide) fuel cell, each (solid oxide) fuel cell comprising an anode, a cathode, and an electrolyte. The reformer may comprise hot- and cold-side channels. The anode loop may supply fuel and reformate to the anode of each (solid oxide) fuel cell, and may comprise a fuel inlet manifold in the fuel cell stack configured to supply fuel and reformate to the anode of each solid oxide fuel cell, a fuel exhaust manifold configured to receive unused fuel from the anode of each solid oxide fuel cell, an anode ejector configured to receive fuel from the fuel source and the fuel exhaust manifold, and the cold-side channels of said reformer configured to receive fuel from said anode ejector. The cathode loop may supply oxidant to the cathode of each (solid oxide) fuel cell, and may comprise an oxidant inlet manifold in the fuel cell stack configured to supply oxidant to the cathode of each (solid oxide) fuel cell, an oxidant exhaust manifold in the fuel cell stack configured to receive unused oxidant from each cathode of the (solid oxide) fuel cells, and a cathode ejector configured to receive oxidant from the oxidant source and the oxidant exhaust manifold and configured to supply oxidant to the oxidant inlet manifold. The auxiliary loop may provide for the combusting a portion of the unused fuel from said fuel exhaust manifold and a portion of the unused oxidant from the oxidant exhaust manifold, and may comprise an auxiliary ejector configured to receive the oxidant from the hot-side channels of the reformer, a portion of the oxidant from the oxidant source, and a portion of the unused fuel from the fuel exhaust manifold and a combustor configured to receive the exhaust from said auxiliary ejector. The auxiliary ejector may receive unused oxidant from the hot-side channels of the reformer configured to receive a portion of the unused oxidant from the oxidant exhaust manifold. The system may further comprise a heat exchanger comprise hot- and cold-side channels located upstream of said cathode ejector such that the cold-side channels receive oxidant from the source of oxidant and the hot side channels receive combustion products in the auxiliary loop. A portion of said unreformed fuel and unused fuel in said anode loop may bypass the cold-side channels of said reformer. The cathode loop may further comprise a catalytic start combustor unit located between the oxidant inlet manifold and the oxidant exhaust manifold, a chrome capture unit located upstream of the fuel cells, and a combustor located downstream of the auxiliary loop and upstream of a turbine.

In accordance with some embodiments of the present disclosure, a fuel cell system having at least one fuel cell and a cathode loop for recycling a portion of an unused oxidant from the fuel cell for reuse in the same fuel cell is provided. The cathode loop may comprise an oxidant inlet manifold in the fuel cell configured to supply oxidant to the fuel cell, an oxidant exhaust manifold in the fuel cell configured to receive unused oxidant from said fuel cells, and a cathode ejector configured to receive oxidant from an oxidant source and the oxidant exhaust manifold and to supply oxidant to the oxidant inlet manifold, wherein a portion of said unused oxidant is supplied directly to said oxidant inlet manifold from said oxidant exhaust manifold via said cathode ejector.

These and many other advantages of the present subject matter will be readily apparent to one skilled in the art to which the disclosure pertains from a perusal of the claims, the appended drawings, and the following detail description of the embodiments.

BRIEF DESCRIPTION OF THE DRAWINGS

FIG. 3 illustrates some components of a fuel cell system in accordance with some embodiments of the present disclosure.

Figure 1A:
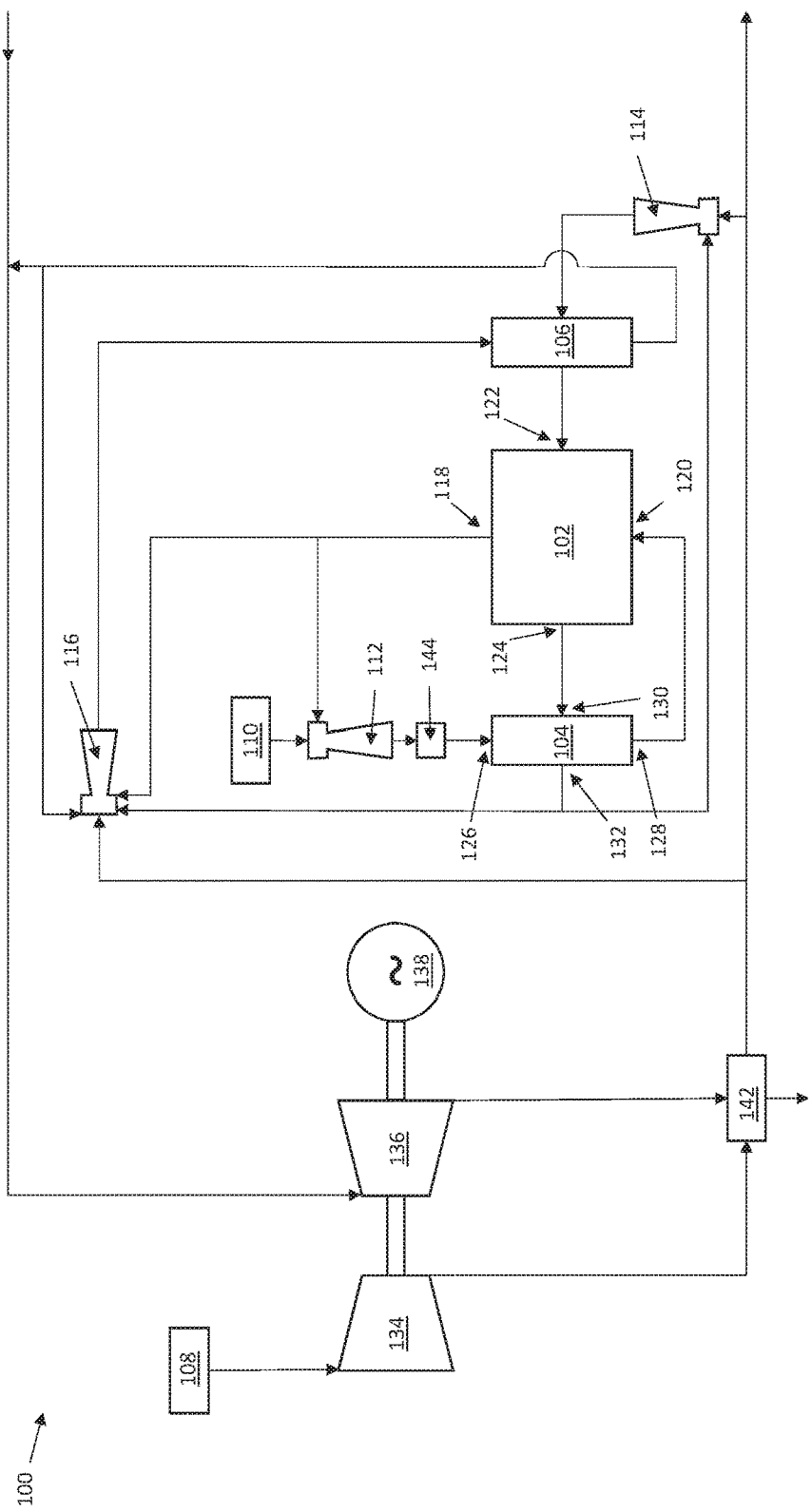
FIGS. 1A and 1B illustrate a fuel cell system.

Referring to the drawings, some aspects of non-limiting examples of a fuel cell system in accordance with an embodiment of the present disclosure are schematically depicted. In the drawings, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

The objectives and advantages of the claimed subject matter will become apparent from the following detailed description of the preferred embodiments thereof in connection with the accompanying drawings.

FIG. 1A illustrates a fuel cell system 100. The system 100 may comprise a fuel cell stack 102 (which may also be known as a fuel cell block), a reformer 104, a heat exchanger 106, a source of oxidant 108, a source of fuel 110, an anode ejector 112 (also referred to as a fuel ejector), a cathode ejector 114 (also referred to as an oxidant ejector) and an auxiliary ejector 116. The system 100 may further comprise auxiliary equipment and components such as compressor 134, turbine 136, generator 138, and recuperator 142.

The fuel cell stack 102 may comprise a plurality of individual fuel cells (not shown). The individual fuel cells may each comprise an anode, a cathode, and an electrolyte.

The fuel cell stack 102 may further comprise a fuel supply manifold 120 (also known as a fuel inlet manifold) that is configured to receive a reformate from the reformer 104. The fuel supply manifold 120 may also be configured to receive an unreformed fuel. The unreformed fuel may be fuel which passed through the reforming section of the reformer 104 but was not reformed, fuel which bypasses the reforming section of the reformer 104, or both. The fuel supply manifold 120 is further configured to supply the reformate, unreformed fuel, or both to the plurality of anodes of the fuel cell stack 102.

The fuel cell stack 102 may further comprise a fuel exhaust manifold 118 configured to exhaust unused fuel (e.g., reformate or unreformed fuel which is not reacted with the oxidant), fuel cell reaction products, or both from the fuel stack 102. The unused fuel may be supplied to the suction of the anode ejector 112, suction of the auxiliary ejector 116, other auxiliary equipment (not shown) such as, e.g., a combustor, vented to the environment, or any combination of these options.

The fuel cell stack 102 may further comprise an oxidant supply manifold 122 (which may be referred to as an oxidant inlet manifold) and an oxidant exhaust manifold 124. The oxidant supply manifold 122 is configured to receive an oxidant from the cathode ejector 114. The oxidant from the cathode ejector 114 may be combined with oxidant which is exhausted from the fuel cell stack 102. The oxidant may pass through the cold-side channels of heat exchanger 106 in which heat is transferred into the oxidant prior to it being received in the oxidant supply manifold 122. The oxidant supply manifold 122 is configured to deliver the oxidant to the plurality of cathodes in the fuel cell stack 102.

The oxidant exhaust manifold 124 is configured to exhaust the oxidant from the fuel cell stack 102 for delivery to the reformer 104 or some other component. In the reformer, the oxidant exhaust passes through the hot-side channels of the reformer 104 to affect a heat transfer into the unreformed fuel and unused fuel streams to aid in the reformation of the unreformed fuel. After exiting the reformer 104, the oxidant exhaust may be supplied to the suction side of cathode ejector 114, the suction side of auxiliary ejector 116, some other component (not shown) such as, e.g., a combustor, vented to the environment, or any combination of these options.

The oxidant exhaust which is supplied to the suction side of the cathode ejector 114 flows through a portion of the cathode loop. The cathode loop consists of the flow path from the cathode ejector 114, through the cold-side channels of the heat exchanger 106, into the oxidant supply manifold 122 from which the oxidant is supplied to the cathodes in the fuel cell stack 102, exhausted out the oxidant exhaust manifold 124, into the hot-side channels of the reformer 104 and back to the suction of the cathode ejector 114. As can be seen, the cathode loop is not a closed system because oxidant is allowed to enter the loop from oxidant supply 108 and to exit the loop to the suction of ejector 116 (or some other component). Additionally, a portion of the oxidant is ionized and diffused through the fuel cell electrolyte.

The reformer 104 may comprise a plurality of cold channels and a plurality of hot channels (not shown). The reformer 104 may further comprise a fuel supply manifold 126, a fuel exhaust manifold 128, an oxidant inlet manifold 130, and an oxidant exhaust manifold 132. The fuel supply manifold 126 is configured to receive fuel from the anode ejector 112 and to supply fuel to the cold side channels of the reformer 104. The cold side channels may comprise a catalyst to reform the fuel. The fuel exhaust manifold 128 is configured to exhaust a reformate from the plurality of cold side channels and to supply the reformate to the fuel supply manifold 120 of the fuel stack 102. The oxidant inlet manifold 130 is configured to receive the oxidant exhausted from the exhaust manifold 124 of the fuel stack 102 and to supply the exhausted oxidant to the hot side channels of the reformer 104. The exhausted oxidant will transfer its heat to the fuel in the plurality of cold-side channels to aid in the catalytic conversion of the unreformed fuel. The oxidant then flows to an oxidant exhaust manifold 132 where the oxidant may be removed from the reformer 104 and sent either to the suction side of the of the cathode ejector 114, auxiliary ejector 116, some other component, exhausted to the atmosphere, or any combination of these options.

Prior to flowing into the oxidant supply manifold 122, the oxidant may flow through the cold-side channels of heat exchanger 106. The hot side channels of heat exchanger 106 may be supplied with a source of hot fluid such as an exhaust from the anode, exhaust from the cathode, or other warm fluid. The warm fluid may be combustion products (or a combusted exhaust) from a combustor that may be integrated into the auxiliary ejector 116 and combusts a portion of the unused fuel exhausted from the anodes of stack, the unused oxidant exhausted from the cathode side of the fuel cell stack 102, oxidant from the compressor 134, or a combination of these fluids. After passing through the hot side channels, the warm fluid may be supplied to the suction side of the auxiliary ejector 116 or may be vented to from the system.

The combustor (which may be integral to the auxiliary ejector 116) may also be supplied with fresh oxidant which may provide the energy used to power auxiliary ejector 116. The auxiliary ejector 116 may draw in a portion of the unused fuel from the fuel exhaust manifold 118, a portion of the oxidant from the oxidant exhaust manifold 132, and may also draw in the combustion gases after those gases pass through the heat exchanger 106.

The anode ejector 112 is configured to receive unreformed fuel from the source of unreformed fuel 110 and to supply it to the fuel supply manifold 126 of the reformer 104. The anode ejector 112 may also draw in a portion of the unused fuel exhausted from the fuel exhaust manifold 118.

In some embodiments, the portion of the fuel cell system 100 may be called an anode loop. This loop may comprise the fuel inlet manifold 120, the fuel exhaust manifold 118, the anode ejector 112, and the cold-side channels of the reformer 104. In some embodiments the loop may further comprise the pre-reformer 144 and the source of fuel 110.

The cathode ejector 114 is configured to receive fresh oxidant from the source of oxidant 108, and may be further configured to receive a portion of the unused oxidant exhausted from the oxidant exhaust manifold 132 of reformer 104. The cathode ejector 114 supplies the oxidant to the hot-side channels of heat exchanger 106.

The source of unreformed fuel 110 may be a source of hydrocarbon or other type of fuel. The source of oxidant 108 may be storage tanks filled with an oxidant such as, e.g., pure oxygen, atmospheric air, or other oxidant source or a system designed to generate a supply of oxidant.

The fuel cell system may further comprise compressor 134, turbine 136, generator 138, and recuperator 142. The recuperator 142 may be supplied with oxidant from the compressor 134 to a set of cold-side channels therein and the exhaust of the turbine 136 to a set of hot-side channels. The recuperator 142 functions to transfer heat between the turbine 136 exhaust and the oxidant supplied by the compressor 134. The turbine 136 may receive the combustion products from, e.g., heat exchanger 106. These products may expand through the turbine 136 that drives the compressor 134 and generator 138. The turbine 136 exhaust may be exhausted to the atmosphere, and may be supplied to the recuperator 142 to effect a heat transfer therein prior to being exhausted to the atmosphere as shown in FIG. 1A. Generator 138 may supply additional electrical power. Compressor 134 may be disposed downstream from the supply of oxidant 108. The compressor 134 may draw-in and compress the oxidant which is used to drive the cathode ejector 114 and auxiliary ejector 116. In some embodiments, a recuperator may be supplied that transfers heat from the exhaust of the turbine 136 and the outlet of the compressor 134. This recuperator may be upstream of the cathode ejector 114 and the auxiliary ejector 116.

In some embodiments, the fuel cell system 100 may be one of a plurality of integrated fuel cell systems. As can be seen on the right hand side of FIG. 1A, the right-pointing arrow beneath the cathode ejector 114 may proceed toward another integrated fuel cell system to supply oxidant to the cathode ejector and auxiliary ejector of that system. In such an embodiment, the compressor 134 may provide compressed oxidant for the plurality of integrated fuel cell systems. Similarly, the exhaust from the heat exchanger 106, auxiliary ejector 116, or both may be supplied to a common exhaust header which feeds into turbine 136. In other embodiments, multiple turbines and compressors may be used among the plurality of integrated fuel cell systems.

Figure 1B:
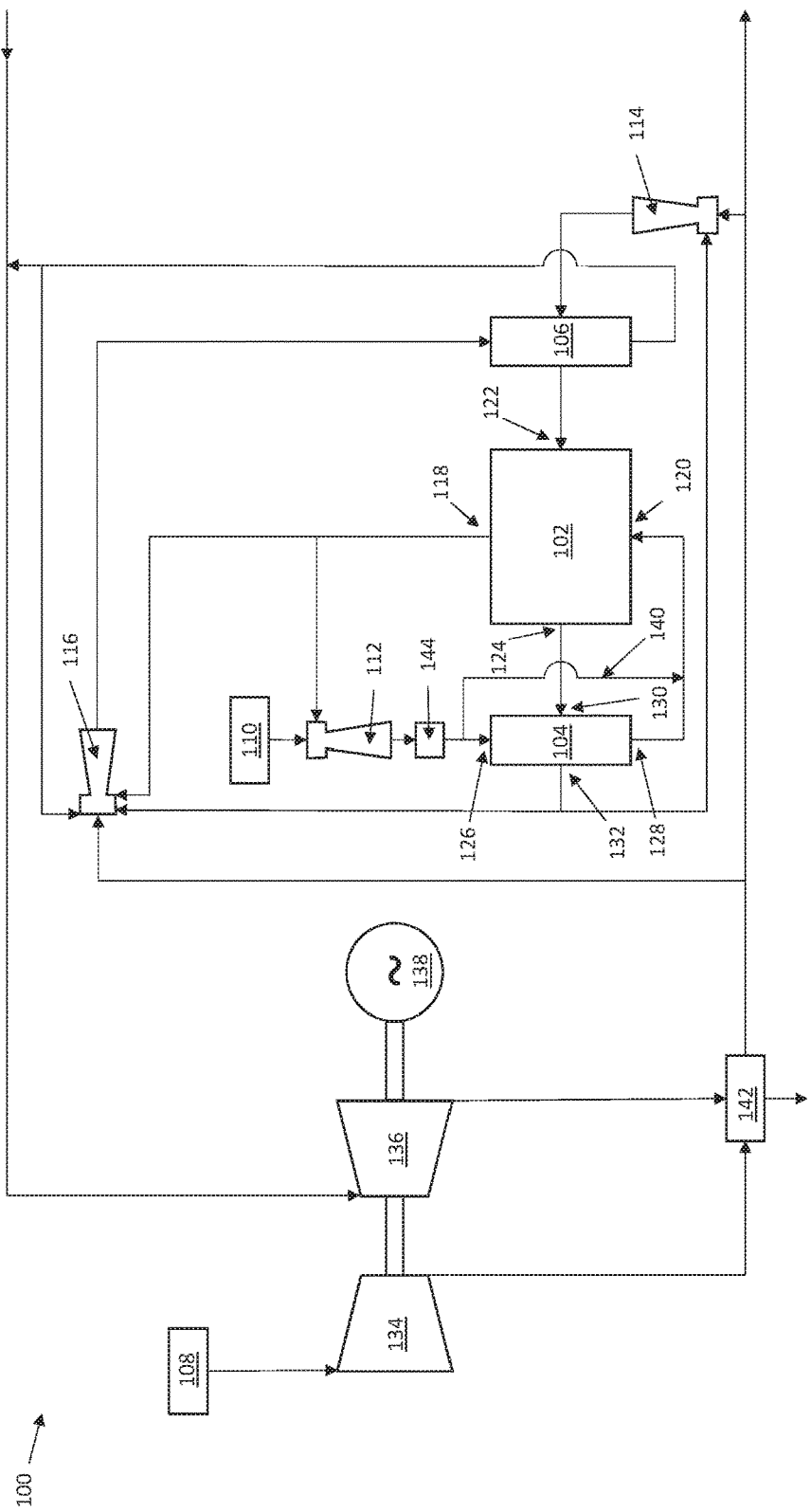

In some embodiments, fuel cell system 100 may further comprise a pre-reformer 144 disposed between the outlet of the anode ejector 112 and the reformer 104. In some embodiments, the pre-reformer may also be upstream of a bypass line (such as bypass line 140 as shown in FIG. 1B). The pre-reformer 144 functions to remove higher hydrocarbons from the stream of fuel from source 110, and any higher hydrocarbons that may exist in the anode exhaust recycled to the anode ejector 112. The pre-reformer 144 may be an adiabatic catalytic converter capable of removing the higher hydrocarbons with no heat input other than the heat from the fuel from source 110 and that recycled from the anode exhaust 118.

FIG. 1B illustrates a fuel cell system 100 which may be similar to that described above. However, the system 100 may include a bypass 140 which provides a flow path for unreformed fuel and the anode exhaust 118 flows to bypass the reformer 104. Bypass 140 may be referred to as a bypass line or duct. The bypass may aide in controlling the amount of internal reforming which may occur in stack 102. The stack 102 may be configured for dry or wet reforming.

In accordance with some embodiments, between 10 and 90 percent of the fuel from source 110 may bypass the reformer 104 via bypass duct 140. In some embodiments, between 20 and 70 percent of the fuel from source 110 may bypass the reformer 104 via bypass duct 140. In some embodiments, between 25 and 50 percent of the fuel from source 110 may bypass the reformer 104 via bypass duct 140.

In accordance with some embodiments, the fuel cell stack 102 and system 100 may be configured for internal reforming such that a substantial portion, or substantially all of the fuel from the source of unreformed fuel 110 is reformed within the fuel cell stack. The internal reforming may be dry or wet reforming. With some or all of fuel reforming occurring in the fuel cell stack 102, the system may not require a reformer external to the fuel cell stack, or may require a smaller reformer.

Figure 2A:
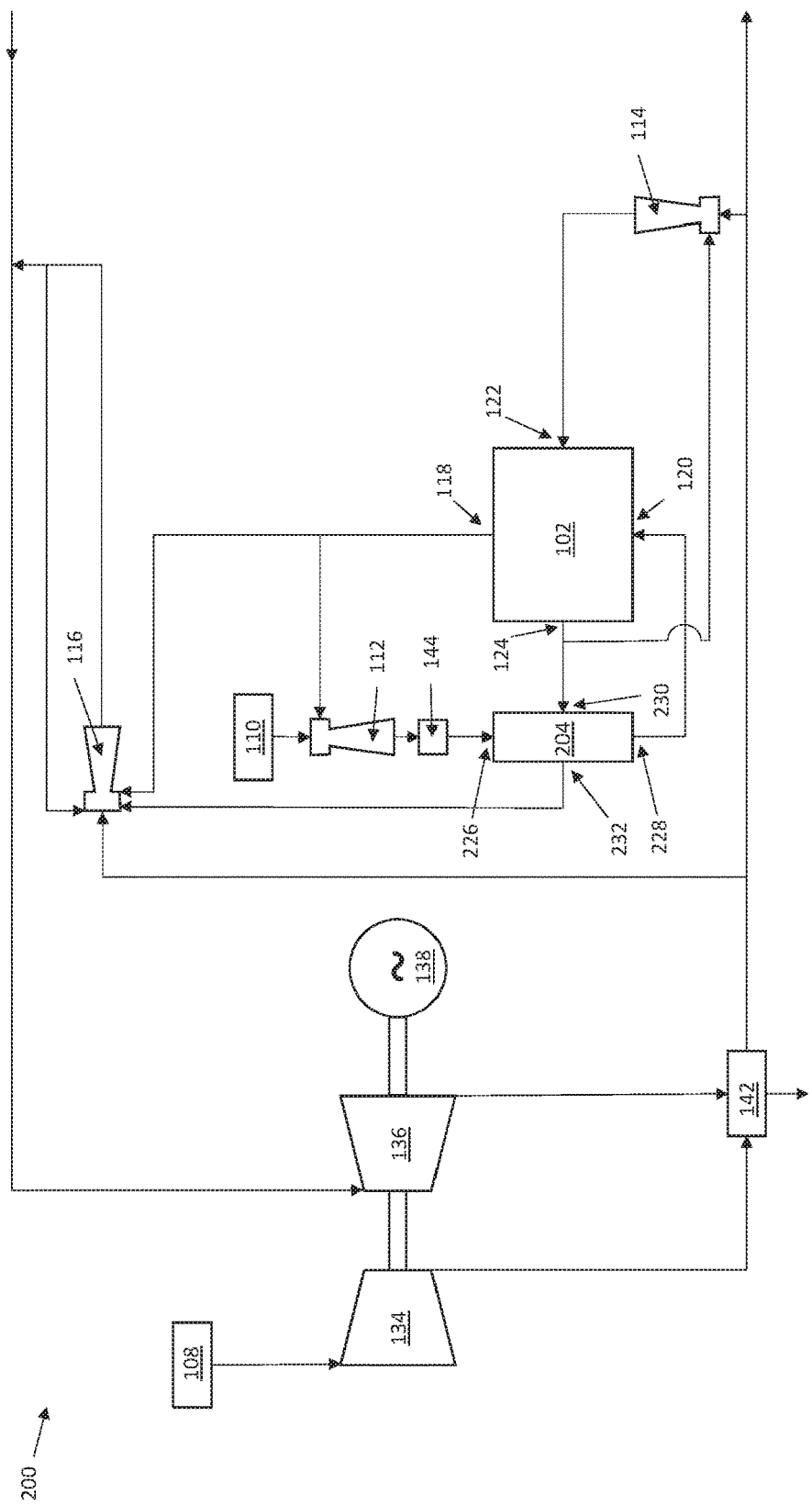
FIGS. 2A and 2B illustrates a fuel cell system in accordance with some embodiments of the present disclosure.

With reference to FIG. 2A, a fuel cell system 200 in accordance with some embodiments of the present disclosure is provided. The fuel cell system 200 comprises a fuel cell stack 102, component 204, a source of oxidant 108, a source of unreformed fuel 110, an anode ejector 112, a cathode ejector 114, and an auxiliary ejector 116. The system 200 may further comprise a compressor 134, turbine 136, generator 138, and recuperator 142. Components with like numbers may be similar to those as described above.

In accordance with some embodiments, the fuel cell stack 102 and system 200 may be configured for internal reforming such that a substantial portion, or substantially all of the fuel from the source of unreformed fuel 110 is reformed within the fuel cell stack. The internal reforming may be dry or wet reforming. With some or all of fuel reforming occurring in the fuel cell stack 102, the system may not require a reformer external to the fuel cell stack, or may require a smaller reformer. In some embodiments, in block reforming of all or at least a portion of the fuel from source 110 facilitates moving the reformer 104 outside of the cathode loop. This removal of the reformer 104 may provide for the recycling of the unused oxidant exhausted from the oxidant exhaust manifold 124 to be returned to the oxidant inlet 122 of the fuel cell stack without passing through any heat exchanger.

Figure 2B:
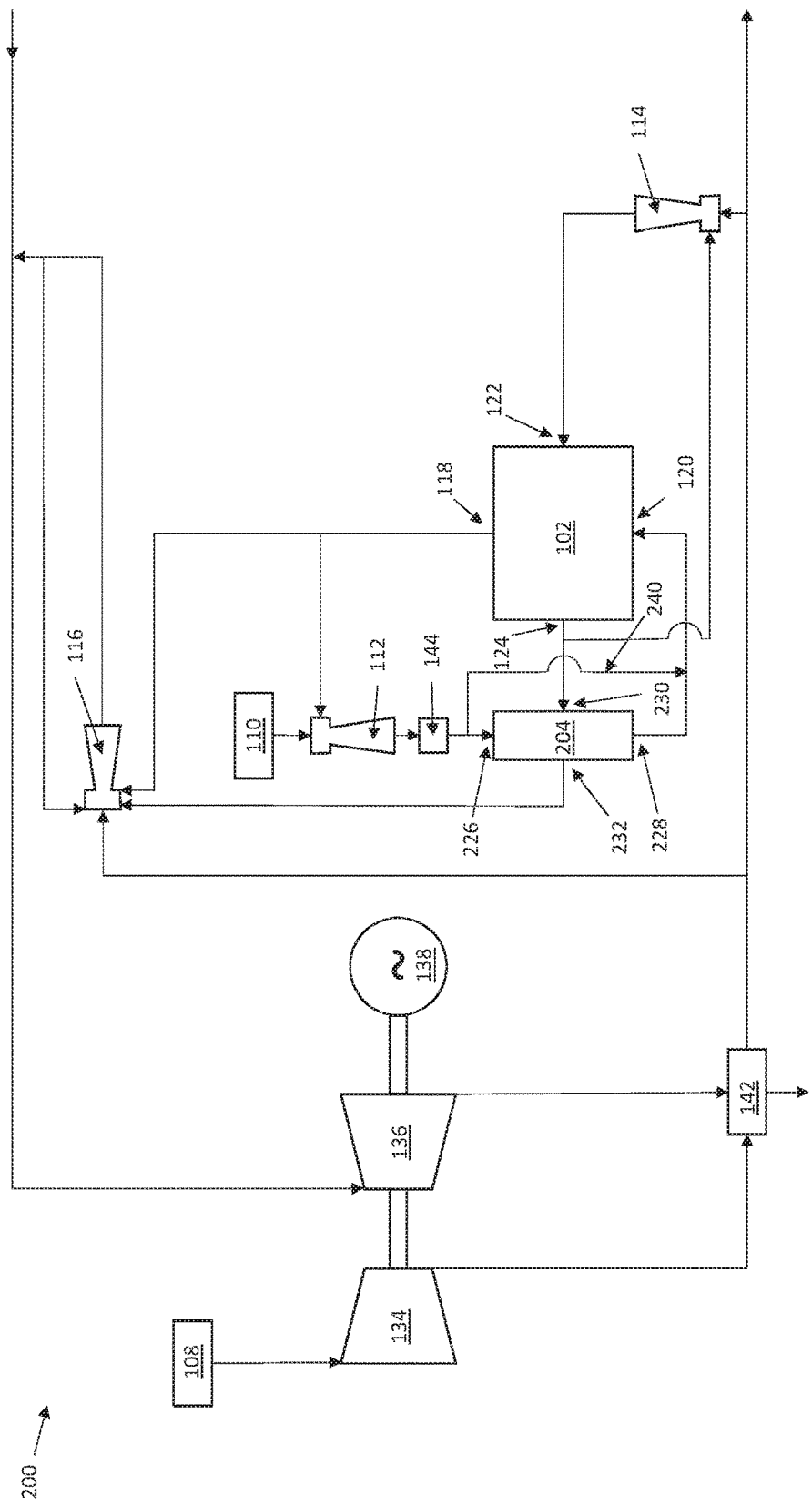

In some embodiments, the reformer 104 is replaced with a component 204, which may be a heat exchanger, such as a counter flow, cross flow, parallel, or other heat exchanger, or a reformer of reduced size. Component 204 is also shown in FIG. 3. With reference to FIG. 2A, FIG. 2B and FIG. 3, the component 204 may comprise a plurality of cold and hot side channels 302, 304, a fuel supply manifold 226, a fuel exhaust manifold 228, an oxidant inlet manifold 230, and an oxidant exhaust manifold 232. The fuel supply manifold 226 may be configured to receive a fuel from the anode ejector 112 and to supply the fuel to the cold-side channels 302. The cold side channels 302 may or may not contain a catalyst for reforming some or all of the fuel. The fuel is then exhausted from the exhaust manifold 228 that removes the fuel from the plurality of cold channels and supplies the reformed or unreformed fuel to the fuel supply manifold 120 of the fuel stack 102. The oxidant inlet manifold 230 is configured to receive a portion of the oxidant exhausted from the oxidant exhaust manifold 124 and to supply this oxidant to hot side channels 304. The oxidant exhaust manifold 232 is configured to supply the oxidant to the suction of the auxiliary ejector 116, some other component such as, e.g., a combustor (not shown), or vented.

With the introduction of in block reforming in the fuel cell stack 102, there is a reduction in the need for the hot-channel flow of oxidant (e.g. cathode exhaust) in component 204, allowing for a substantial reduction in size of component 204 when compared to reformer 104. Additionally, component 204 may be placed further away from the fuel cell stack 102, and may not require a high a flow rate of cathode exhaust to facilitate any fuel reformation occurring in component 204

In some embodiments, the fuel supply manifold 226, or other component prior to the cold-side channels 302, may contain a pre-reforming section, allowing the adiabatic reforming of a portion of the unreformed fuel in component 204.

In some embodiments, the cathode loop may comprise the flow of oxidant from the cathode ejector 114 to oxidant supply manifold 122 of the fuel cell stack 102, out of the fuel cell stack 102 via the oxidant exhaust manifold 124 and return to the suction side of the cathode ejector 114. In some embodiments, the cathode loop may comprise the flow of oxidant from the cathode ejector 114 to oxidant supply manifold 122 of the fuel cell stack 102, out of the fuel cell stack 102 via the oxidant exhaust manifold 124 and return to the suction side of the cathode ejector 114. In some embodiments the cathode loop may be considered to include the source of oxidant 108 and the additional components shown between the oxidant source 108 and the fuel cell stack 102 as described herein. In some embodiments, a portion unused oxidant received at the exhaust manifold 124 may be directly supplied to the oxidant inlet manifold 122 via the air ejector.

The volumetric flow rate of the air existing the cathode loop toward component 204 may be between 10 and 33% of the air flowing through the cathode loop. In some embodiments, the volumetric flow rate of the cathode exhaust through the cathode loop is between 2 and 8 times greater than the flowrate of the cathode exhaust leaving the cathode loop to be supplied to the component 204. In some embodiments, the volumetric flow rate of the cathode exhaust through the cathode loop is between 4 and 7 times greater than the flowrate leaving the cathode loop to be supplied to the component 204. In some embodiments, no less than two-thirds of the unused oxidant from cathode exhaust may be recycled to the fuel cell stack oxidant inlet manifold 122.

One of ordinary skill will appreciate that the amount of cathode exhaust which is supplied to component 204 must be balance with the amount of fuel which is reformed in the component 204 to ensure that a sufficient amount of heat is exchanged in the component 204 to support the desired level of reformation within the component 204.

FIG. 2B illustrates a fuel cell system 200 which may be similar to that described above. However, the system 200 may include a bypass 240 which provides a flow path for unreformed fuel and the anode exhaust 118 flows to bypass around the component 204. The bypass 240 may aide in controlling the amount of internal reforming which may occur in stack 102.

As shown in FIG. 3, a portion of the oxidant exhaust from oxidant exhaust manifold 124 is supplied to the oxidant inlet manifold 230 of component 204, as represented by arrow 306. The remaining portion of the oxidant exhaust is drawn back to the cathode ejector 114, as shown by arrow 308. In this configuration, the oxidant flowing through component 204 is oxidant which has left the cathode loop.

In accordance with some embodiments, no component is located between the cathode ejector 114 and the fuel cell stack 102 which is configured to transfer heat into the oxidant. This heat exchanger may be removed while the cathode loop is maintained in thermal equilibrium because the large heat-sink reformer 104 is removed from the cathode loop. This may also allow for a slight reduction in the cathode loop temperature, allowing for a small power increase from the fuel cell stack 102. Additionally, with the removal of heat exchanger 106, the need for the auxiliary loop (the loop supplied by auxiliary ejector 116) and a combustor may be removed. However, in some embodiments a small heat exchanger may be disposed upstream of the fuel cell stack 102 for warm-up of the fuel cell system 200.

Figure 4:
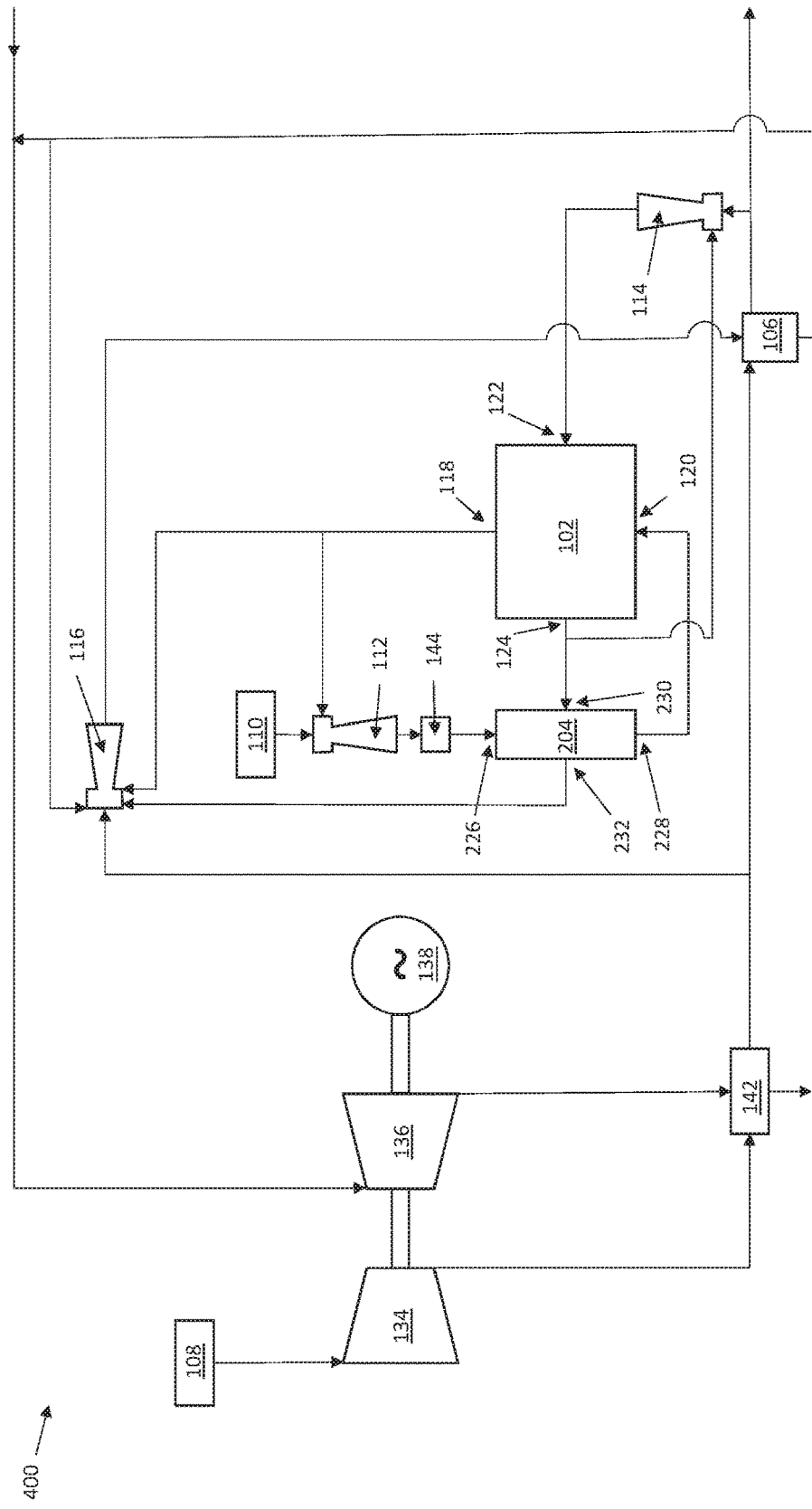
FIG. 4 illustrates a fuel cell system in accordance with some embodiments of the present disclosure.

In accordance with some embodiments of the present disclosure, a fuel cell system 400 is provided in FIG. 4. Components with like numbers may be similar to those as described above. The system 400 may comprise a heat exchanger 106 disposed upstream of cathode ejector 114. This heat exchanger may transfer heat into the flow of fresh oxidant.

Figure 5:
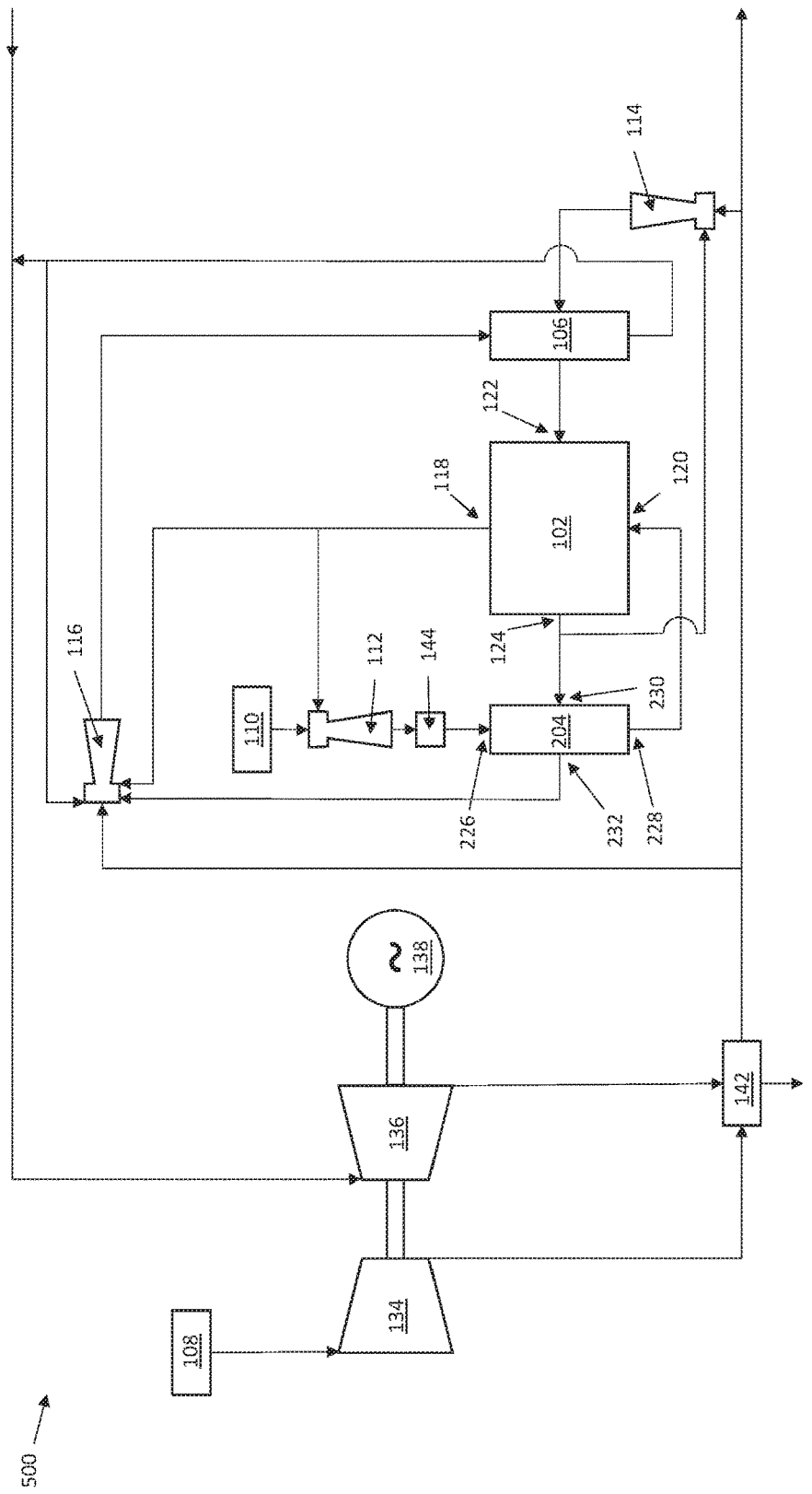
FIG. 5 illustrates a fuel cell system in accordance with some embodiments of the present disclosure.

In accordance with some embodiments of the present disclosure, a fuel cell system 500 is provided in FIG. 5. Components with like numbers may be similar to those as described above. The system 500 may comprise a heat exchanger 106 disposed downstream of cathode ejector 114 and upstream of the fuel cell stack 102. This heat exchanger may transfer heat into combined fresh oxidant and oxidant recycled in the cathode loop.

In accordance with some embodiments, the source of unreformed fuel 110, anode ejector 112, component 204, or a combination thereof is configured to supply an unreformed fuel to the fuel supply manifold 120 of the fuel cell stack 102. This unreformed fuel may join a reformate fuel prior to the fuel supply manifold 120.

In accordance with some embodiments, a method of balancing the heat transfer in a cathode loop during steady-state operations of a fuel cell system is provided. The fuel cell system may comprise a cathode loop for circulating an oxidant through the fuel cell stack where heat is transferred from the cathode loop in a reformer. Heat is transferred into the cathode loop in an inlet heat exchanger positioned between the cathode loop outlet of the reformer and a cathode loop inlet of the fuel cell stack. The method may comprise reforming the fuel in the fuel cells stack, removing the reformer from the cathode loop, and removing the inlet heat exchanger from the cathode loop. Only a portion of the oxidant exhausted from the fuel cell sack may be provided to the reformer.

Figure 6:
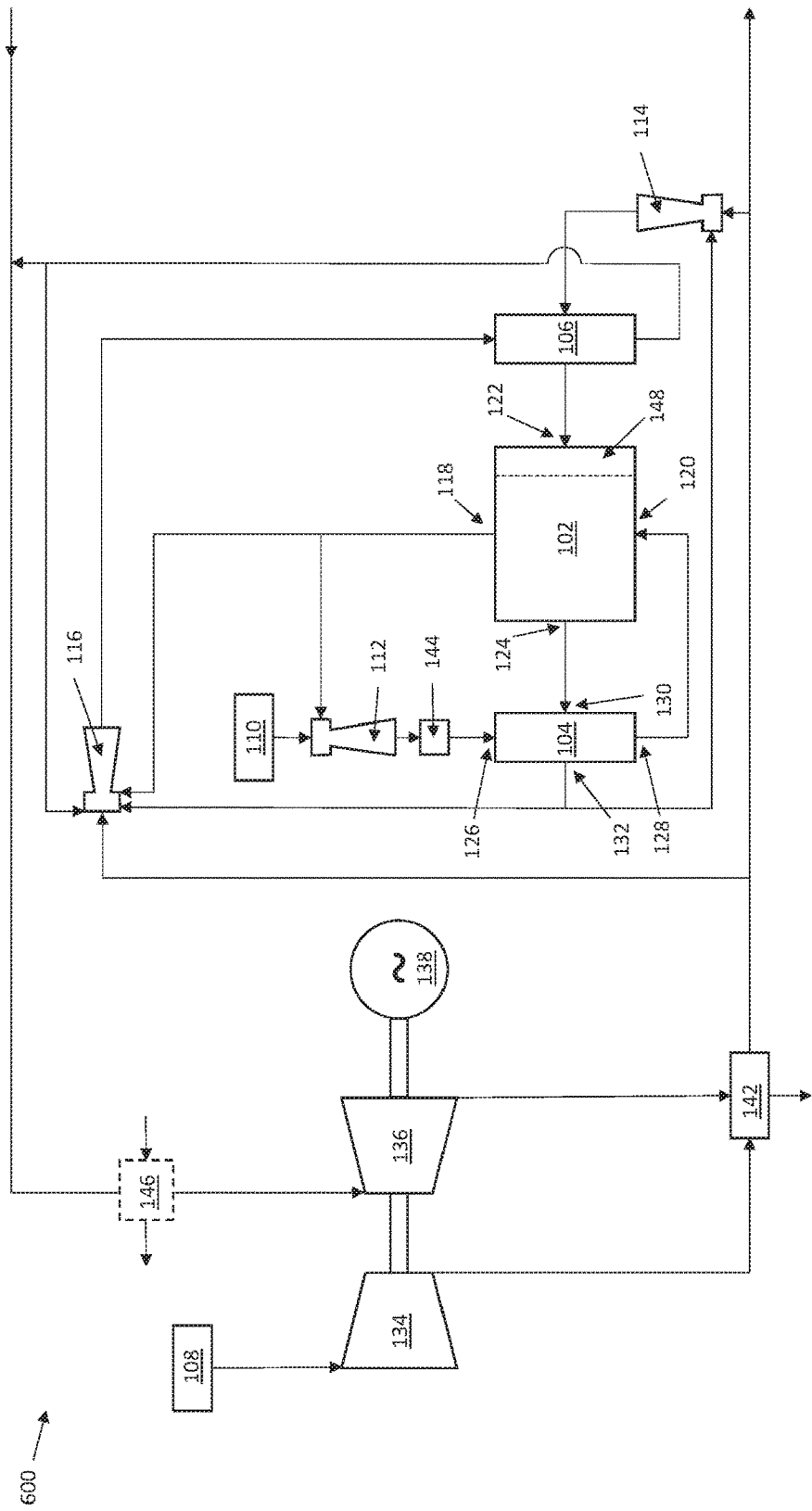
FIG. 6 illustrates a fuel cell system in accordance with some embodiments of the present disclosure.

In accordance with some embodiments, a fuel cell system 600 is illustrated in FIG. 6. The fuel cell system 600 may comprise similar components having similar functions to those described above, with liked numbered components corresponding to those components described above. Additionally, the fuel cell system 600 may further comprise a starting combustor unit 148, such as, e.g., a catalytic start combustor unit (or "catalytic combustor unit"), and a combustor 146. Combustor unit 148 may be used during start-up, shutdown, or during other operations in which the fuel cell system 600 may not generate sufficient heat to maintain the desired operation without the combustor unit 148. As shown in more detail in FIG. 8, combustor 148 may comprise a fuel supply manifold that injects a fuel into the cathode loop that is subsequently ignited by a combustion catalyst. When the cathode loop fluid flow, components that directly contact the cathode loop airflow, or both reach a sufficiently high temperature, the fuel supplied to the cathode loop may auto ignite before reaching the combustor unit 148. Combustor unit 148 may also be referred to as a heater.

Combustor 146 may be used to increase the temperature and pressure of a fluid sufficiently to rotate the turbine 136 and provide a required work output when the fuel cell system 600 may be otherwise unable to supply this fluid. Combustor 146 may further be operable to receive fresh oxidant, fuel (reformed or otherwise), or both to achieve this purpose through combustion. As shown in FIG. 6, combustor 146 may also receive a portion of the exhaust from the auxiliary loop. This exhaust may contain unburned fuel and oxidant that may be reacted within combustor 146 to provide a fluid of sufficient temperature and pressure to supply the energy necessary to rotate compressor 134 through the expansion of the fluid through the turbine 136.

Figure 7:
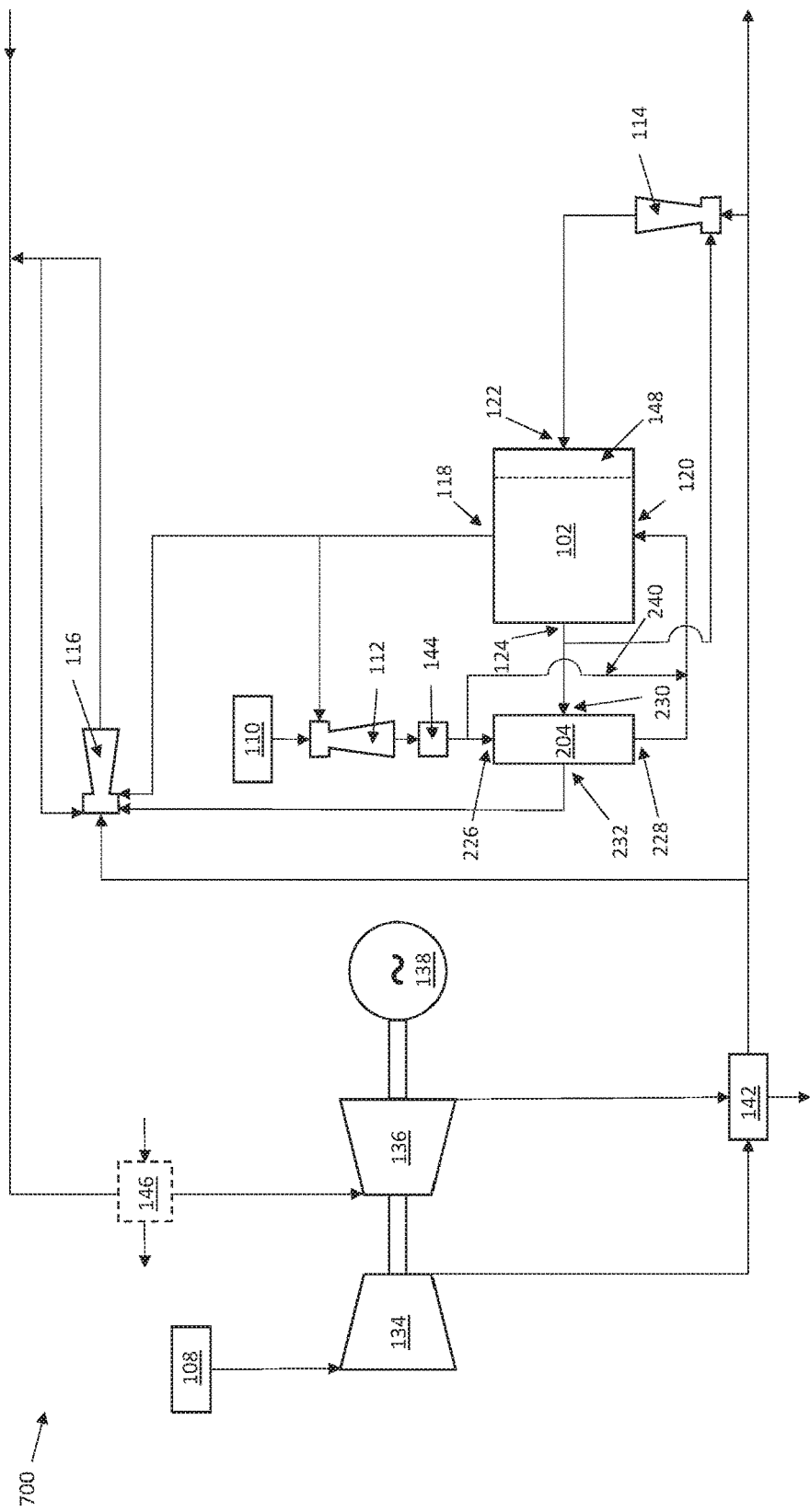
FIG. 7 illustrates a fuel cell system in accordance with some embodiments of the present disclosure.

While components 146 and 148 are shown in the embodiment of FIG. 6, one of skill will understand that these components may be used in any of the embodiments described herein. For example, FIG. 7 illustrates a further embodiment having the starting combustor unit 148 and the combustor 146. In FIG. 7 compared to FIG. 6, component 204 replaces reformer 104, bypass 240 is added, and the cathode loop recycle line (i.e. the line upstream of component 204 that returns to the suction of cathode ejector 114) is added. Additionally, FIG. 7 may also comprise components not shown in this figure, but shown in other figures. For example, the auxiliary loop of FIG. 7 may include cathode heat exchanger 106. This heat exchanger 106 may be placed downstream of the cathode air ejector 114. In some embodiments, heat exchanger 106 may be located in the high-pressure oxidant supply line upstream of cathode ejector 114 (e.g., as shown in FIG. 4).

Figure 8:
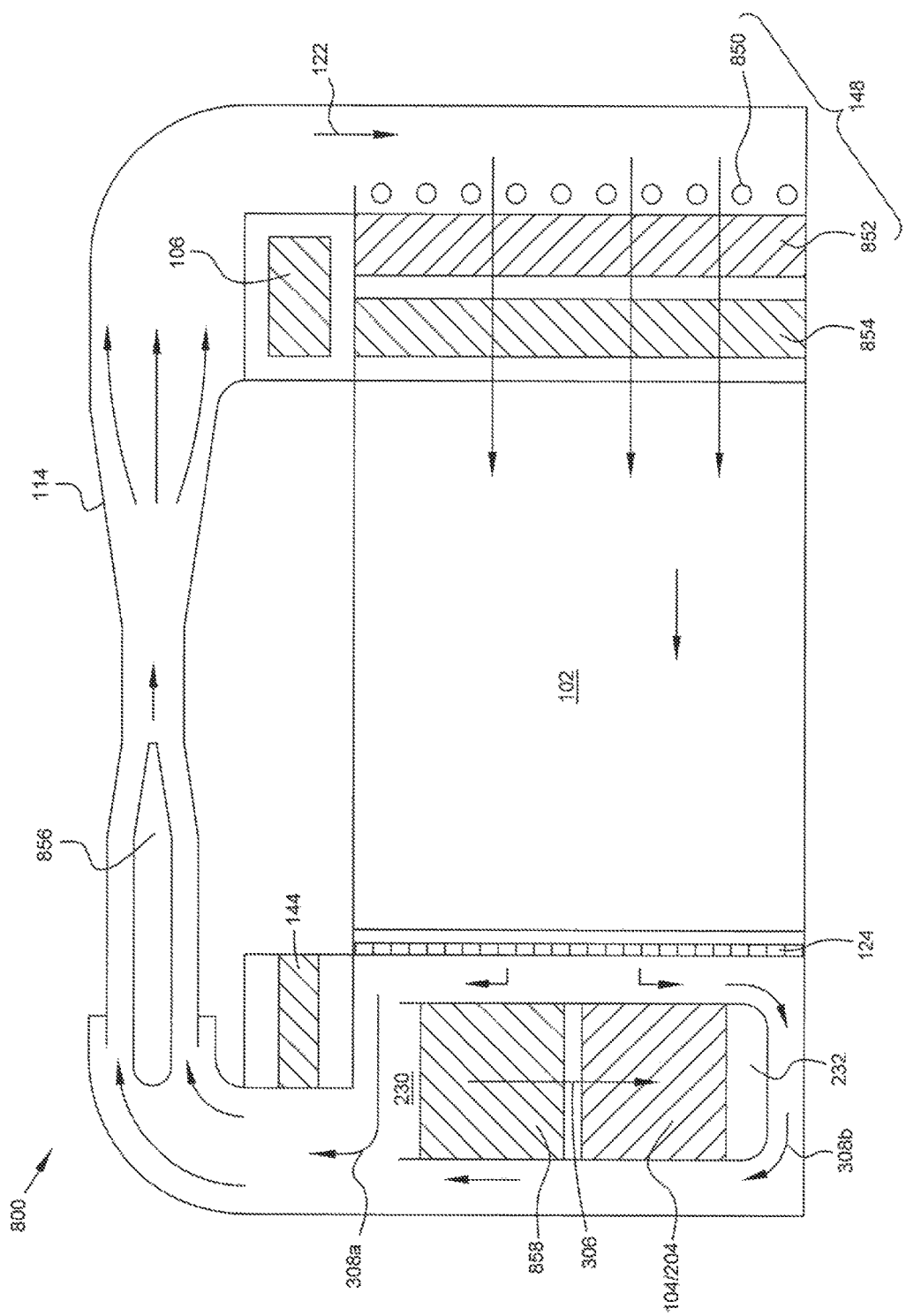
FIGS. 8-10 illustrate various view of an integrated fuel cell block in accordance with some embodiments of the present disclosure.

In accordance with some embodiments of the present disclosure, an elevation view of an integrated fuel cell block 800 is illustrated in FIG. 8. This figure shows the various flows associated the with cathode loop of one or more of the fuel cell systems described above. The integrated fuel cell block 800 shown in FIG. 8 may comprise components having similar structures and functions as those described above. For example, integrated fuel cell block 800 may comprise fuel cell block 102, heat exchanger 106, cathode ejector 114, oxidant supply manifold 122, oxidant exhaust manifold 124, reformer 104 or component 204, combustor 148, oxidant supply manifold 230, oxidant exhaust manifold 232, return (or recycle) oxidant flows 308, and an oxidant flow supplied to component 204/reformer 104 represented by arrow 306. As described in relation to various figures above, some of these components, e.g., heat exchanger 106 and component 204 may not be present in the integrated block 800 because their function may not be required depending on temperature balances and the extent of any in block reforming in fuel cell block 102. The integrated fuel cell block 800 may further comprise fuel supply manifold 850, catalytic start combustor unit 852, chrome capture unit 854, cathode primary flow air pipe 856 and fuel pre-heater unit 858.

As shown in FIG. 8, oxidant exhaust manifold 124 may comprise a pressure control plate configured to provide a more uniform cathode/oxidant flow to the fuel cells of fuel cell block 102.

As shown in FIG. 8, heat exchanger 106 may be located upstream of the cathode ejector 114 cathode primary flow pipe 856. Fresh oxidant from the oxidant source 108 (after passing through compressor 134 and heat exchanger 142) may be warmed by heat exchanger 106 prior to entering the cathode loop. Additionally, the positioning of the heat exchanger 106 may provide some amount of radiative heat transfer into the cathode loop when it is located in sufficient proximity to the cathode loop.

Fuel supply manifold 850 and catalytic start combustor unit 852 may both be part of the combustor unit 148 as shown in FIGS. 6 and 7. The fuel supply manifold 850 may supply a fuel, e.g., hydrogen or natural gas, directly into the cathode loop fluid flow. While the cathode loop air temperature is too low to auto-ignite the fuel supplied from manifold 850, the fuel may be ignited after contacting the catalytic start combustor unit 852. With the combustion of the fuel, the temperature of the cathode loop airflow is raised, and in turn, the integrated block fuel cell system 800 may be brought up an operating temperature at which the fuel cell electrochemical reaction can be efficiently maintained.

The oxidant flow entering the cathode loop via the cathode primary airflow pipe 856 may be at a temperature of 400 to 500 degrees C. due to the compression of the oxidant by compressor 134 (shown in other figures) and heat input from heat exchanger 142 (where present). This temperature, however, is several hundred degrees lower than the typical SOFC operating range of 800-900 degrees C. To raise the temperature of the cathode loop flow, oxidant may pass through the heat exchanger 106 (also shown in FIG. 9). During normal operations, heat exchanger 106 may be provided the combustion products of the fuel unused by the fuel cells block 102 from the auxiliary loop. These high temperature fluids may then transfer heat into the fresh oxidant, raising its temperature sufficiently such that the temperature of cathode loop is maintained in balance. However, fuel may not be flowing in the anode loop (FIG. 10) during the startup, shutdown, or other operating phases. Without fuel in the anode loop, the auxiliary loop will not have fuel unused by the fuel cells block 102 to combust. In these scenarios, combustor 148 may provide the heat input required to bring the cathode loop up to operating temperature.

The heating function of catalytic start combustor 148 may be provided until the integrated fuel cell block 800 is making power. When power is being generated by the fuel cell block 102, electrical losses in the fuel cell system provide a significant amount of heat. This heat may be captured, in part, in the cathode loop oxidant fluid. Since a significant portion of the total cathode loop airflow is recycled, the cathode loop flow will function to maintain the integrated block at the desired temperature.

Chrome capture unit 854 may be provided to provide protective features for the fuel cells located downstream of chrome capture unit 854. A protective chrome oxide layer may be formed on the surface of integrated fuel cell block 800 components because such layers function well at the high temperatures required for efficient solid oxide fuel cell operations. However, the release of chrome from these components can be detrimental to fuel cell system performed because the chrome can position fuel cell electrodes. Therefore, chrome capture unit 854 is provided upstream of the fuel cell block 102 to capture released chrome.

A portion of the cathode oxidant flow may be diverted to the fuel preheater unit 858 and the reformer 104/component 204. This diverted oxidant is represented by arrow 306. On the cathode loop side, fuel pre-heater unit 858 may be located upstream of reformer 104/component 204. The reformation of the fuel in the anode loop requires a heat input. This heat input accomplished in part by using the warmer, cathode loop flow to raise the temperature of the fuel prior to entering reformer 104 (or component 204). Additionally, the cathode loop flow represented by arrow 306 is also used downstream of the fuel pre-heater unit 858 to provide the heat input for the reformation (in whole or in part) of the fuel in reformer 104/component 204.

As shown in FIG. 8, a portion of the cathode loop flow may be recycled and return to a suction of the cathode ejector 114. In particular, a portion of the cathode loop recycle flow represented by arrow 308*b* may flow around the outside of the fuel pre-heater unit 858 and/or reformer 104/component 204. The oxidant flow 308*b* may be in sufficient proximity to the reformer 104/component 204 to effect a heat transfer thereto. In some embodiments, the cathode recycle flow represented by arrow 308*b* may "wash" the reformer 104/component 204, wherein the cathode flows around in contact with the aforementioned components prior to returning to the cathode ejector recycle suction.

A portion of the recycled cathode loop flow may proceed more directly to the suction of the cathode air ejector 114 as represented by arrow 308*a*. As such, a portion of the oxidant in the cathode loop will be recycled by the paths shown by 308*a* and 308*b*, and another portion of the oxidant will leave the cathode loop via oxidant supply manifold 230 to be supplied to the auxiliary ejector 116 via the oxidant exhaust manifold 232.

The proportion of recycled cathode loop flow flowing to the paths represented by arrow 308*a* and arrow 308*b* will be a function primarily of the amount of reformation that occurs in reformer 104 or component 204, and, consequently, the amount of heat input needed into these components. In some embodiments, the reformer 104/component 204 may be designed to operate in an equilibrium in which there is not a complete reformation of the fuel passing therethrough. This "incomplete" reformation equilibrium may be used such that a portion of the fuel can be subsequently reformed in the fuel cell block 102, wherein the heat input for reformation can come from the electrical losses within and between fuel cells. Additionally, by controlling the amount of reformation that occurs in reformer 104/component 204, any catalyst in these components can be made to last for a longer period of time, thereby extending component life. To maintain the reformed 104/component 204 in equilibrium via temperature control. Therefore, the heat input from the cathode-loop exiting flow 306 and the recycled oxidant (primarily 308*b*) flowing around the reformer 104/component 204 can be designed to result in the desired temperature and resulting reformation equilibrium to achieve a partial reformation of the fuel.

Figure 9:
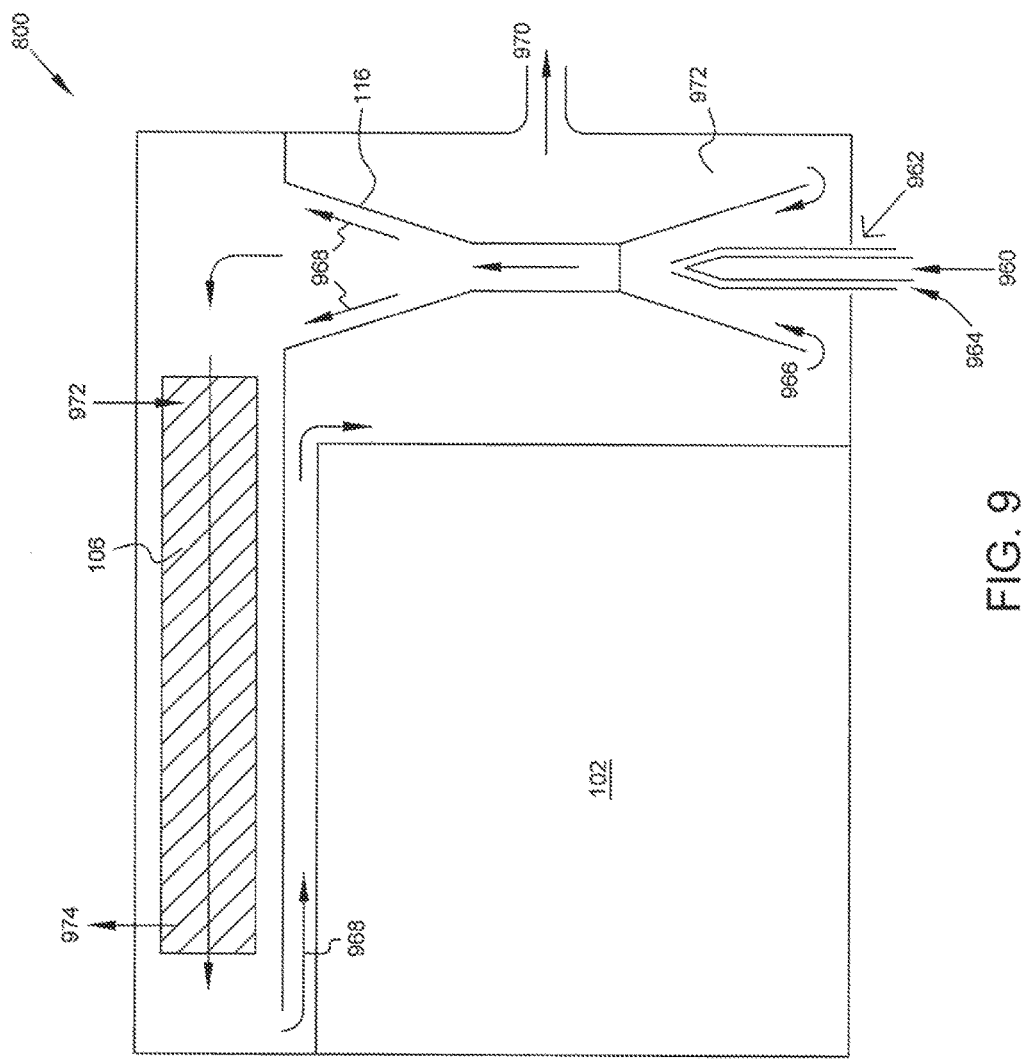

In accordance with some embodiments of the present disclosure, an alternate elevation view of the integrated fuel cell block 800 shown in FIG. 8 is illustrated in FIG. 9. FIG. 9 shows the various flows associated with the auxiliary loop of one or more fuel cell systems as described above. This loops shows the fuel cell block 102, heat exchanger 106 and auxiliary ejector 116. Each of the shown components may comprise the structures and perform the functions of similar components as described above.

Auxiliary ejector 116 is driven by the pressurized oxidant flow from the compressor 134 as shown by arrow 960. This flow in turn creates a low pressure area that draws in various fluid flows to include: a portion of the unused fuel flow from fuel exhaust manifold 118 at arrow 964; a portion of the non-recycled cathode loop flow from oxidant exhaust manifold 232 from the reformer 104 or component 204 at 962; and, a portion of the auxiliary fluid flow as represented by arrow 966, which may be considered a recycled portion of the auxiliary fluid flow. As described earlier, ejector 116 may contain an integral combustor used to ignite the unused fuel and oxidant flow in the combined fluid flow 968. In some embodiments, the combustor may be located outside of the ejector 116. The combusted fluid 968 then flows to heat exchanger 106 to provide a heat input into the fresh oxidant upstream of the cathode ejector 114. The fresh oxidant may enter at 972 and exit at 974 prior to being supplied to the cathode ejector 114. The cooled combined flow 968 then returns to an auxiliary loop return feed plenum/manifold 972. A portion of the auxiliary flow may be recycled at 966, completing the auxiliary loop. Some of the auxiliary flow may exit the auxiliary loop at 970 to be supplied directly or indirectly to, e.g., turbine 136. As shown in FIG. 9, both the recycled and exhausted auxiliary flows 966 and 970 may flow around, or "wash," the auxiliary ejector 116, which may effect a heat transfer into the fluid flowing in the ejector 116 prior to combustion.

Figure 10:
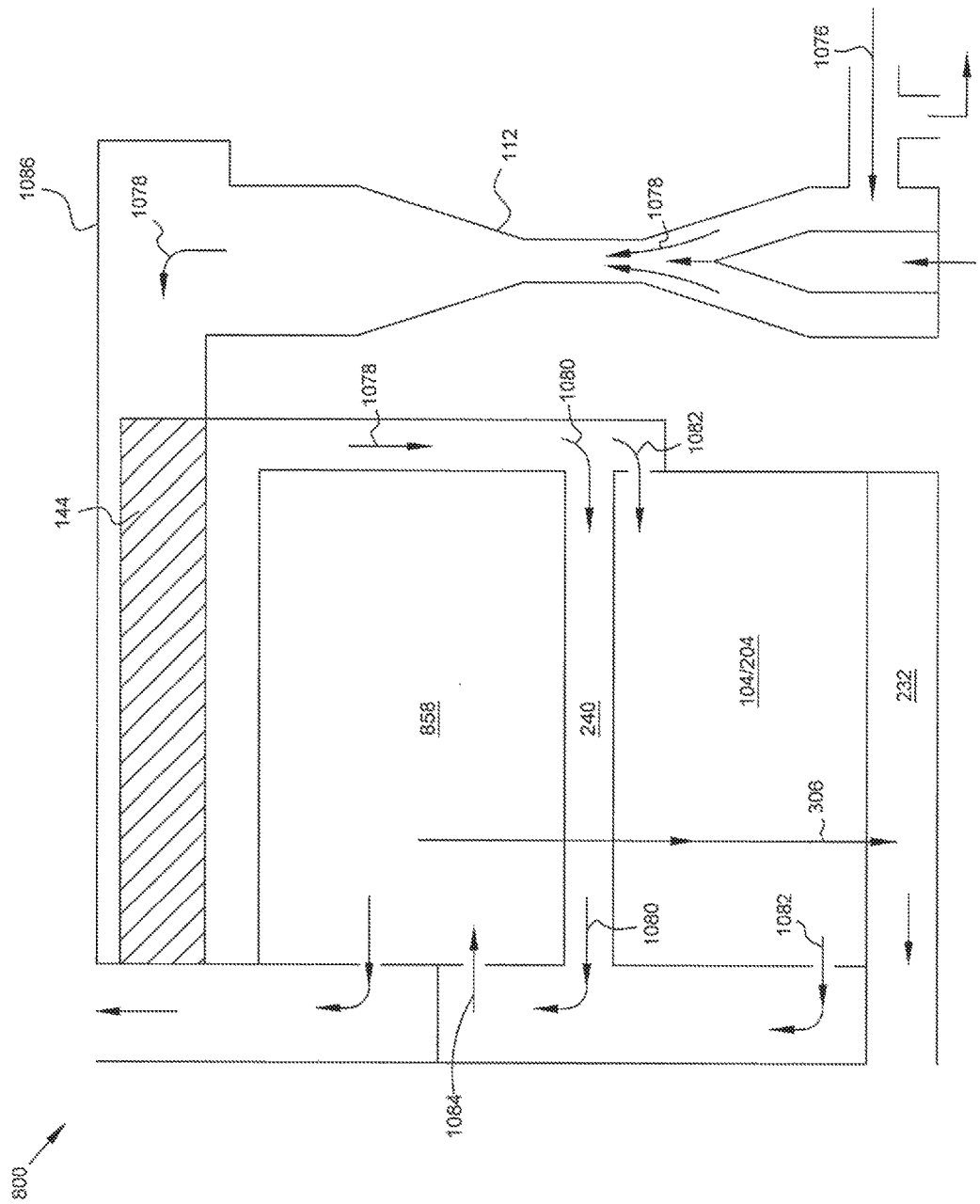

In accordance with some embodiments of the present disclosure, an alternate elevation view of the integrated fuel cell block 800 shown in FIGS. 8 and 9 is illustrated in FIG. 10. This figure shows the various flows associate the with anode loop of one or more fuel cell systems as described above. The integrated fuel cell block system 800 may comprise the anode ejector 112, pre-reformer 144, reformer 104/component 204, pre-heater 858 and other shown components each of which may have the structures and perform the functions as described above for similar components.

Unreformed fuel may enter the anode ejector 112 from the fuel source 110 at 1074. The pressurized fuel flowing in the ejector 112 creates a suction that will draw a portion of the unused fuel exhausted from the fuel exhaust manifold 118 at 1076. The combined flow 1078 of unused fuel and fresh fuel then flows to the pre-reformer unit 144, wherein the combined flow 1078 passes through and higher hydrocarbons are removed. The pre-reformed combined flow 1078 then flows down and around the fuel pre-heater 858. A portion of the combined flow 1078 may then flow into the bypass 240 at 1080. The remaining portion of the combined flow 1078 enters the reformer 104/component 204 to be reformed, heated, or both at 1082. Heat inputted into the fuel flow 1082 is provided by the cathode air 306. The ratio of the bypassing flow 1080 to that flow 1082 entering reformer 104/component 204 may be controlled by an orifice in the bypass line 240. The flows 1080 and 1082 are then recombined at 1084 and enter the pre-heater heat exchanger 858, wherein heat from the cathode flow 306 is transferred into the combined flow 1084. The combined flow of warmed unreformed and reformed fuel is then provided to the fuel supply manifold 120 of the fuel cell block 102. The cathode exhaust flow 306 is the exhausted through the cathode exhaust manifold 232.

The portion (which may be, e.g., piping, duct work, etc.) at 1086 may be coated with a material to prevent carbon formation. In particular, all exposed surfaces between the anode ejector 112 exhaust nozzle and the pre-reformer 144 may be coated, heated, or both to prevent carbon deposition as described further below. Either coating or heating may be referred to as treating. In some embodiments, all internal surfaces of the fuel manifold situated between the anode ejector 112 and the pre-reformer 144 should be protected by a coating or other means to prevent carbon formation on the internal surface of the manifold. It is important that the main fuel flow stream does not come into direct contact with the manifold surfaces. The protection may be applied directly on to the manifold surfaces, or may be in the form of separate thin metal inserts that are located within the manifold close to the manifold surfaces. In the case where a coating is applied directly this coating can either be an inert coating or an active coating. In the case where separate inserts are employed, such inserts will be coated with protective material which can either be inert or active. An inert coating may be a refractory oxide material such as alumina, which may be applied directly on the surface or generated through chemical vapor deposition of aluminum and subsequent oxidation. An active coating will include a catalyst suitable for steam reforming, and may contain Rh or Pt.

Figure 11A:
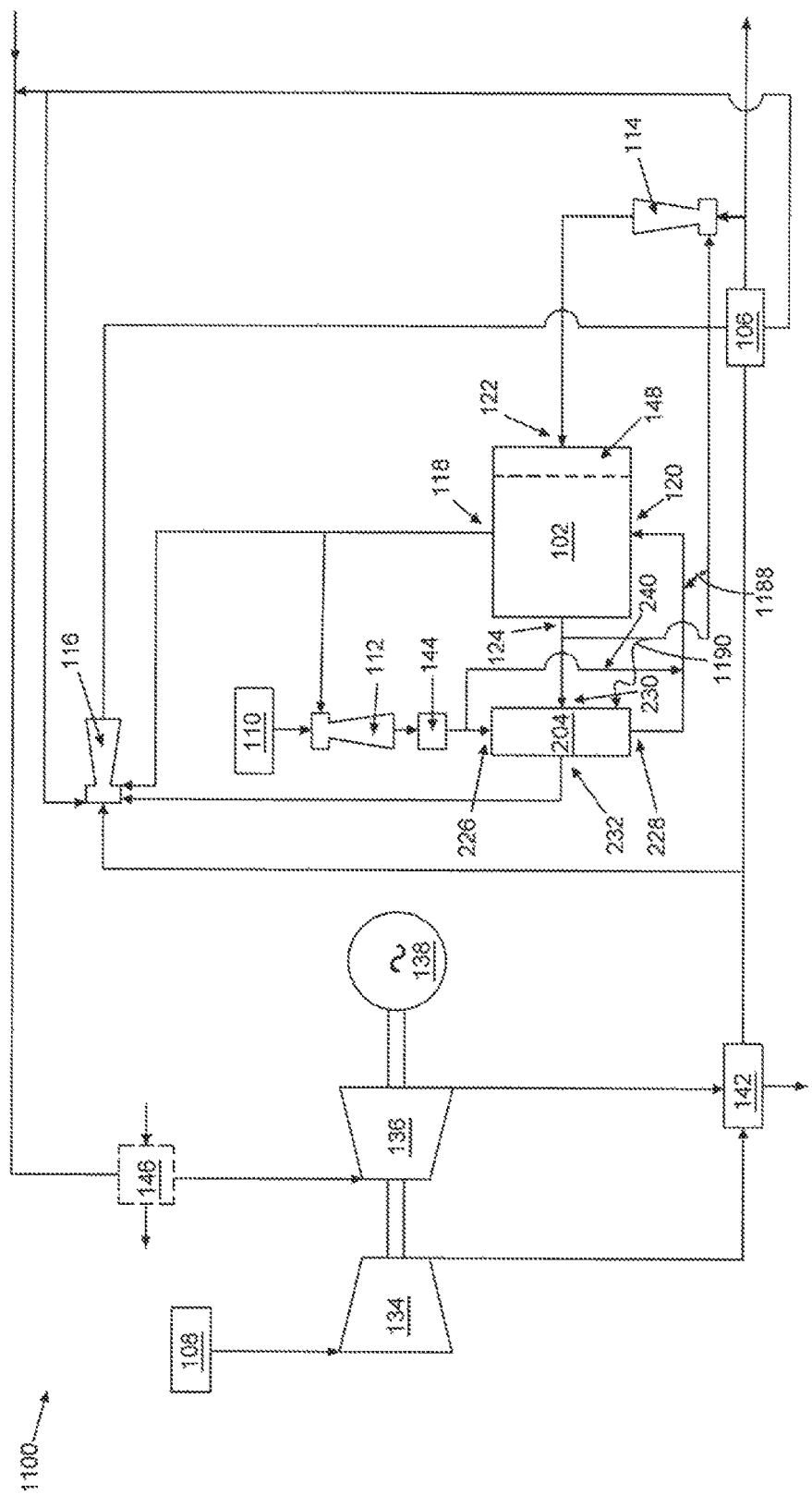
FIGS. 11A and 11B illustrate a fuel cell system in accordance with some embodiments of the present disclosure.
Figure 11B:
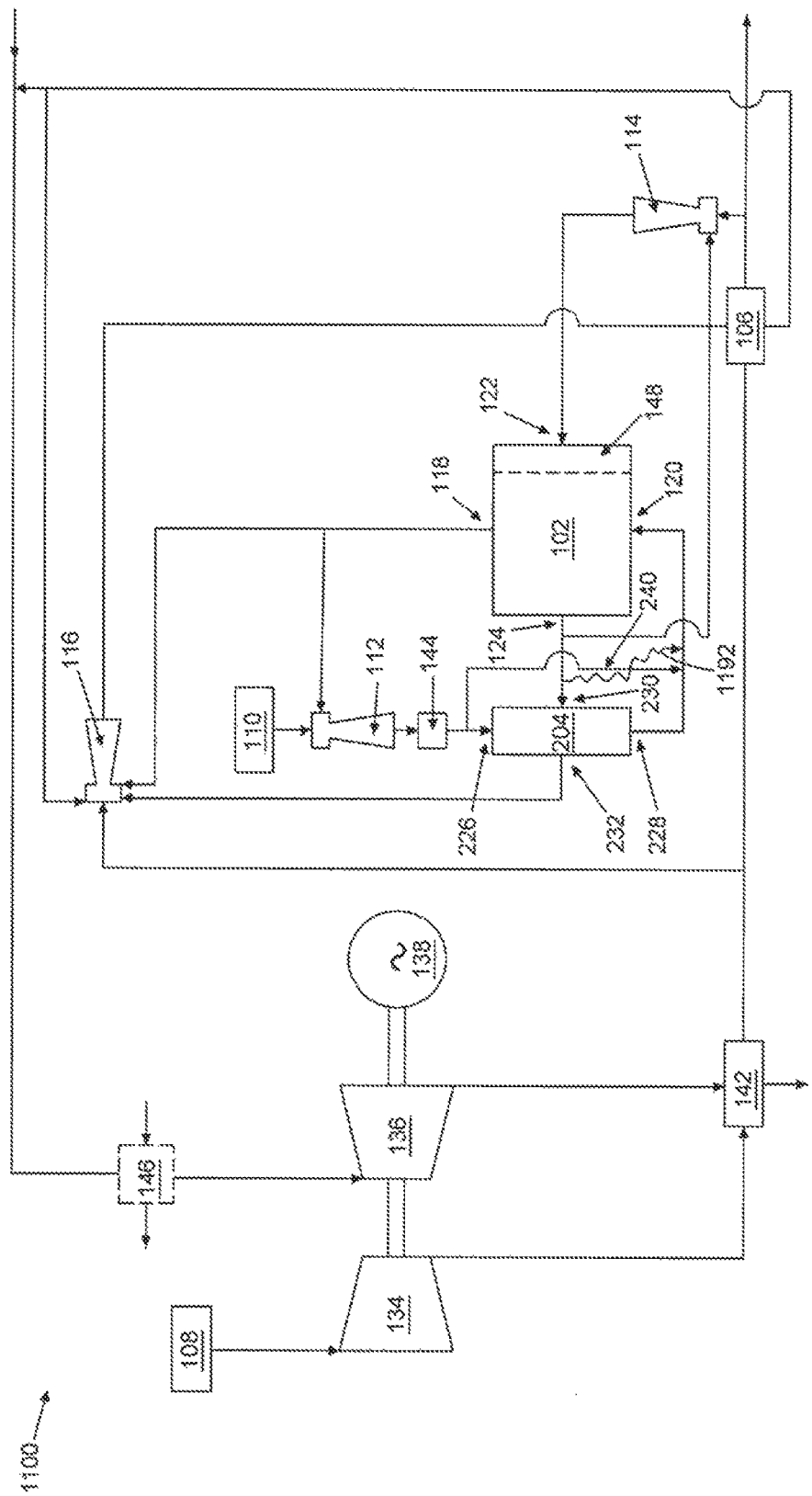

In accordance with some embodiments of the present disclosure, a fuel cell system 1100 is illustrated in FIGS. 11A to 11B. This fuel cell system 1100 may comprise a variety of components, wherein the like numbered components performed functions and have structures like those of the components having the same or similar numbering as described above. Additionally, component 142 may be located downstream of ejector 116, such that the auxiliary flow receives a heat input from the turbine 136 exhaust. Additionally, the fuel cell system of FIG. 11 may have materials coated to proximate to the outlet of the anode ejector 112 to avoid carbon formation, which may cause adverse effects on active materials, particularly metals. This coating may extend to the pre-reformer 144.

FIG. 11A illustrates the radiative heat transfers between the cathode loop recycle line (the portion of the oxidant flow diverted from the oxidant supply manifold 230 to return to the cathode ejector 114) and reformer 104/component 204 and to the fuel pre-heater 858 prior to supplying the fuel to the fuel supply manifold 120. As shown, with reference also to FIG. 8, a portion of the cathode recycle line is in sufficient proximity to, and may wash the external surfaces of, reformer 104/component 204 and fuel pre-heater 858 to effect a heat transfer. The heat transferred between the recycled oxidant and the fuel pre-heater 858 (not shown) is represented by arrow 1188. The heat transferred between the recycled oxidant and the reformer 104/component 204 is represented by arrow 1190.

In accordance with some embodiments of the present disclosure, a fuel cell system 1100 is illustrated in FIG. 11B. FIG. 11B illustrates heat transfer that occurs between the non-recycled cathode flow and the fuel preheater 858 (not shown). This heat transfer is represented by arrow 1192.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

We claim:
1. A fuel cell system comprising:
a fuel cell stack comprising at least one fuel cell, each fuel cell comprising an anode, a cathode, and an electrolyte;
a reformer comprising cold-side channels and hot-side channels;
a source of fuel;
an anode loop for supplying fuel and reformate to the anode of each fuel cell, said anode loop comprising:
a fuel inlet manifold in said fuel cell stack configured to supply fuel and reformate to the anode of each fuel cell;
a fuel exhaust manifold configured to receive unused fuel from the anode of each fuel cell;
an anode ejector configured to receive fuel from said fuel source and said fuel exhaust manifold;
a pre-reformer configured to remove higher hydrocarbons from said fuel from said fuel source and said fuel exhaust manifold;
the cold-side channels of said reformer configured to receive fuel from said anode ejector;
a bypass line configured to bypass a portion of fuel exhausted by said anode ejector around said cold-side channels of said reformer;
wherein said fuel ducting between said anode ejector and said pre-reformer is treated to prevent carbon formation;
a source of oxidant;
a compressor configured to receive oxidant from said oxidant source;
a cathode loop for supplying oxidant to the cathode of each fuel cell, said cathode loop comprising:
an oxidant inlet manifold in said fuel cell stack configured to supply oxidant to the cathode of each fuel cell;
an oxidant exhaust manifold in said fuel cell stack configured to receive unused oxidant from each cathode of said fuel cells;
a cathode ejector configured to receive oxidant from said oxidant source and said oxidant exhaust manifold and configured to supply oxidant to said oxidant inlet manifold;
a catalytic start combustor unit between said oxidant inlet manifold and said oxidant exhaust manifold;
wherein a portion of the oxidant exhausted from said oxidant exhaust manifold of said fuel cell stack passes through the hot-side channels of said reformer;
a heat exchanger comprising hot-side and cold-side channels located upstream of said cathode ejector, wherein oxidant from said source of oxidant passes through said cold-side channels
and
an auxiliary loop for combusting a portion of the unused fuel from said fuel exhaust manifold and said portion of the unused oxidant from said oxidant exhaust manifold, said auxiliary loop comprising:
an auxiliary ejector configured to receive said portion of the unused oxidant from the hot-side channels of said reformer, a portion of the oxidant from said source of oxidant, and a portion of the unused fuel from said fuel exhaust manifold;

a combustor configured to combust the exhaust from said auxiliary ejector; and the hot-side channels of said heat exchanger configured to receive the combusted exhaust from said combustor; and a turbine configured to receive the exhaust from said combustor.

* * * * *